United States Patent [19]

Le Bris et al.

[11] Patent Number: 5,561,557

[45] Date of Patent: Oct. 1, 1996

[54] NIGHT VISION BINOCULARS WITH ELECTRONIC IMAGING

[75] Inventors: Didier Le Bris, Laxou; Pierre Maigre, Aydoilles, both of France

[73] Assignee: EPREST Electronique Professionnelle De L'Est, Luneville, France

[21] Appl. No.: 254,693

[22] Filed: Jun. 6, 1994

[30] Foreign Application Priority Data

Jun. 11, 1993 [FR] France ................................... 93 07048

[51] Int. Cl.⁶ ............................ G02B 23/00; G02B 27/02; H01J 31/50
[52] U.S. Cl. ........................ 359/409; 359/407; 359/480; 250/214 VT; 250/556
[58] Field of Search ..................................... 359/404, 407, 359/406, 409, 480; 250/214 VT, 556

[56] References Cited

U.S. PATENT DOCUMENTS 4,000,419  12/1976  Crost et al. ..................... 250/214 VT
5,254,852  10/1993  Filipovich et al. ............... 250/214 VT
5,294,788  3/1994   Charon et al. ................... 250/214 VT

FOREIGN PATENT DOCUMENTS

0381449A3  8/1990  European Pat. Off. .
2160739   12/1985  United Kingdom .

*Primary Examiner*—Thong Nguyen
*Assistant Examiner*—Mohammad Y. Sikder
*Attorney, Agent, or Firm*—Oblon, Spivak, McClelland, Maier & Neustadt, P.C.

[57] ABSTRACT

Night vision binoculars including an optical system for the projection of an incident light flux formed by an objective which is itself coupled through an image-reducing interface to detection means in matrix form where the image from the interface is converted into a video signal supplied to at least one miniature display coupled to an ocular. The binoculars may take the form of two modules that can be fitted into each other, a body module and a binocular visor module. Application to night vision by electronic imaging with overlay of additional information elements.

10 Claims, 2 Drawing Sheets

NIGHT VISION BINOCULARS WITH ELECTRONIC IMAGING

BACKGROUND OF THE INVENTION

The field of the invention relates to the display of scenes or scenery, more especially in night viewing conditions, by implementing easy-to-handle and transportable means such as binoculars.

Conventionally, under the conditions referred to, a scene is observed by means of a telescope, a periscope or a pair of binoculars which are appreciated for their quality of luminosity.

More recently, head-up type display devices have appeared. These devices enable the superimposition, on the optical image, of another image displaying additional information elements in the visor (for example, information elements pertaining to the time elapsed, localization on a map, reference numbers etc.) related to the optical image. The additional information elements generally come from a cathode-ray tube or a liquid crystal screen and are transmitted by optic fibers and/or through adapted optical elements (such as mirrors, lenses, semi-reflector mirrors etc.) up to the main optical axis of the visor. An assembly such as this is described, for example, in the U.S. Pat. No. 4,915,487. In this document, the additional information elements are carried through one of the two optical channels of a pair of binoculars. For night vision, provision is made in conventional systems for the activation of a light intensifier tube. In general, the day/night optical systems such as periscopes, episcopes, etc. have light intensifier tubes such as these positioned in an path that can be switched over if necessary (see for example the patent FR 2 578 062).

Furthermore, there are day-and-night observation devices, known notably from the patent GB 2 149 141, that integrate an infrared imaging system for night vision. Such systems have the advantage of giving an image with a quality that is far higher than that given with light intensifiers alone.

However, infrared imaging systems are cumbersome, difficult to handle and complicated.

SUMMARY OF THE INVENTION

The invention proposes an electronic imaging night vision device that is easy to transport and can be manipulated through the application of natural movements.

The invention is based on the implementation of a particular arrangement of elements in a compact binoculars-type device enabling the display, through the eyepiece of this device, of an electronic image of the scene by means of an objective of this device.

More specifically, the object of the invention relates to a pair of night vision binoculars with electronic imaging, comprising an optical system for the projection, on detection means, of an incident light flux coming from an observed scene, wherein the optical system comprises an objective coupled to a light intensifier tube which is itself coupled, through an image-reducing interface, to said detection means wherein said binoculars include at least one means for the display of an image of said scene formed out of a video signal delivered by the detection means and transmitted to ocular means.

According to a preferred embodiment, the device according to the invention takes the form of a modular pair of binoculars, constituted by two modules, namely a body module of the binoculars and a visor module, that fit into each other.

According to a preferred characteristic, the image-reducing interface is formed by a conical harness of j optic fibers whose ends are bonded, firstly, to the output fiber of the light intensifier tube and, secondly, to the detection matrix. The detection matrix is preferably of the charge-coupled device (CCD) type.

Advantageously, the means used to display the scene obtained from the signal delivered by the CCD matrix are constituted by a cathode-ray microtube or by a liquid-crystal display device. According to one exemplary embodiment, it is possible to use only one display device coupled to an optical combination so as to form an image on each of the optical paths of the binocular visor or, according to another exemplary embodiment, to use one display device per optical channel of the visor.

It is also advantageous to make profitable use of the implementation of means for the formation of an image, for the overlaying thereon of the complementary information elements (delivered by an electronic compass, telemeter, dater etc.). The overlay is obtained by means of video signal processing cards incorporated into the body of the binoculars.

BRIEF DESCRIPTION OF THE DRAWINGS

Other advantages and characteristics shall appear from the following description, made with reference to the appended figures, of which:

In FIGS. 1 and 4, the device according to the invention is partially transparent so as to let constituent elements be seen.

DESCRIPTION OF THE PREFERRED EMBODIMENTS

Figure 1:
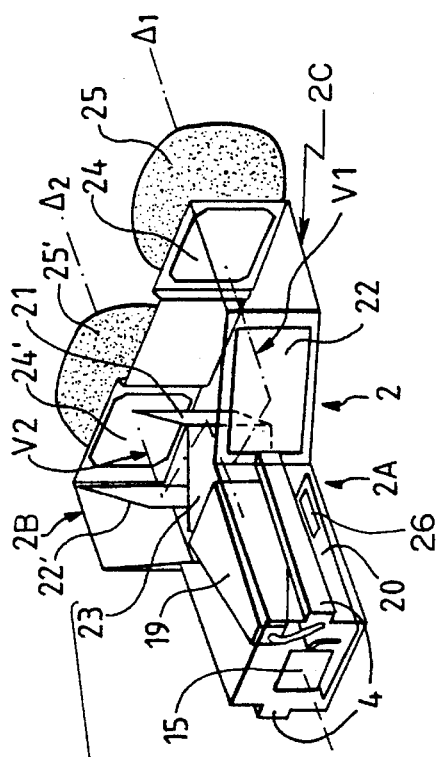
FIG. 1 shows a first exemplary embodiment, in modular form, of the device according to the invention seen split into its two modular parts.
Figure 2:
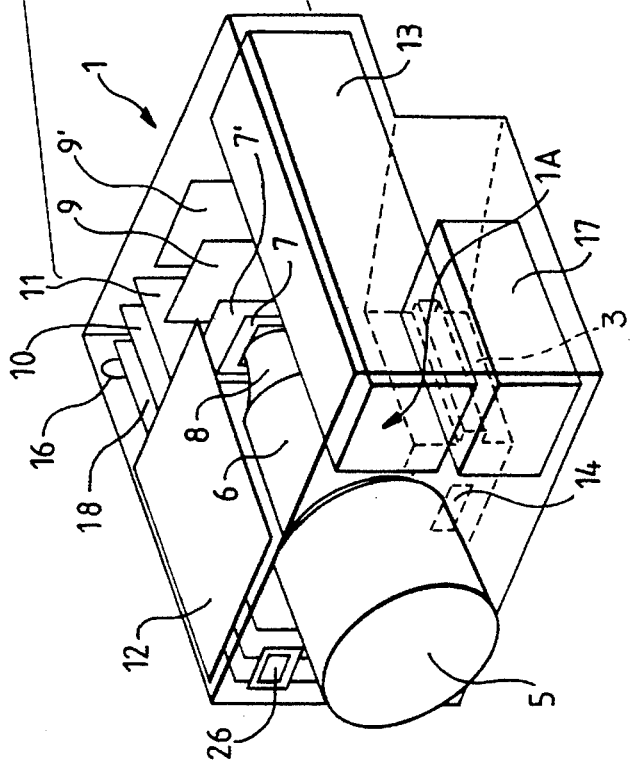
FIG. 2 shows a sectional view of the device according to FIG. 1, after the fitting together of the modules.
Figure 3:
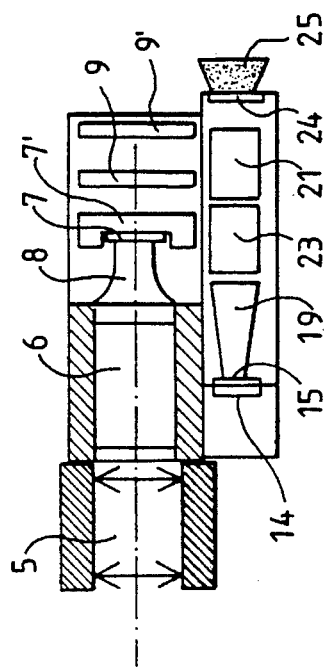
FIG. 3 shows a top view of the optical duplication system of the binocular visor seen in schematic form.

FIGS. 1 to 3 show an exemplary embodiment of the invention in the form of a modular structure, respectively in a cutaway view before assembly and in a sectional view after the two constituent modules are fitted together: a substantially parallelepiped-shaped body 1 of a pair of binoculars (hereinafter called the body 1) and a binocular visor 2 that can be fitted with each other. These means for fitting the elements together are, for example, grooves 3 and slides 4 positioned respectively in a housing 1A of the body 1 and on a frontal projection 2A of the visor 2.

The body 1 has an interchangeable objective 5, optically coupled to a light intensifier tube 6 whose photocathode coincides with the focal plane of the objective 5. The tube 6 is optically conjugate with a matrix detector 7, fixed into a support structure 7' by means of an image-reducing interface 8. The image-reducing interface is coupled, for example by bonding, between the output of the tube 6 and the matrix detector 7.

For example:

the image-reducing interface may be constituted by a conical harness of an ordered arrangement of optic fibers with a diameter of 6 µm, its input diameter being 18.5 mm and its output diameter being 8.4 mm;

the light intensifier tube may be a tube with microchannels known per se, having a plane optic fiber output with a diameter matching that of the reducing harness;

the detector matrix is a ½ inch CCD type charge transfer matrix, for example of the type marketed under the brand name of SONY with a resolution of 500×582 pixels or 752×582 pixels.

The detection matrix 7 delivers a signal that is applied to one or more electronic cards 9 and 9'. The use of a card such as this is a standard one and can be found for example in CCD cameras. This card places the information elements given at the output of the detection matrix in the form of video signals adapted to existing standards. In a manner known per se, the card may also include the adaptation of supply and of clock signals for the detection matrix and the internal working of the card.

The standard video signal coming from the card 9 or 9' is applied to video processing cards 10 and 11. These cards prepare video overlays upon command by the operator. These overlays give information coming from various elements: for example an electronic compass 12, a telemeter 13 and/or a dater 26, this dater 26 being integrated with one of the video processing cards. Standard complementary processing operations of the signal such as filtering operations are also integrated with one of the processing cards 10 or 11.

A video signal thus processed is sent to the visor module by means of two half-connectors, respectively 14 on the binocular casing and 15 on the visor module, achieving a connection by plugging during the assembly of the binoculars. The processed video signal is also available on an output plug 16 in order to be advantageously applied to peripherals such as auxiliary monitors or video recorders. This application enables other operators to follow, on auxiliary monitors, the scene observed through binoculars by a first operator.

In a known way, the electrical power is given by a source 17 (battery, accumulator or adaptor) that can be integrated into the casing of the body of the binoculars. An electronic card 18 is also used, in a manner known per se, to generate the voltages needed for the operation of the whole binocular set. Fastening devices can also be positioned on the casing (such as a device for fixing to pedestals, fixing device for frontal gripping or for a conveyer belt).

In the exemplary embodiment shown in FIG. 1, the binocular visor module 2 has an electronic display device 19 connected to the half-connector 15 by means of an electronic card 20. This display device may be a cathode-ray microtube, as illustrated, or a liquid crystal display screen having appropriate dimensions. According to known procedures, the electronic card 20 matches the video signal coming from the half-connector 15 with the display device 19 used.

The image given by the display device 19 is duplicated so as to be optically transmitted along two transmission channels V1 and V2 having axes Δ1 and Δ2 positioned in two side parts 2C and 2B. The duplication is achieved, in the example shown, by an optical combination having three mirrors 21, 22 and 22' and a separator plate 23. Other means (for example optic fibers) may be used to obtain this duplication.

At output of each optical transmission channel, an ocular device 24, 24' is used to adapt the image to the operator's view. Visual comfort can be improved by the positioning of an eye protection piece 25, 25' on each optical channel.

Figure 4:
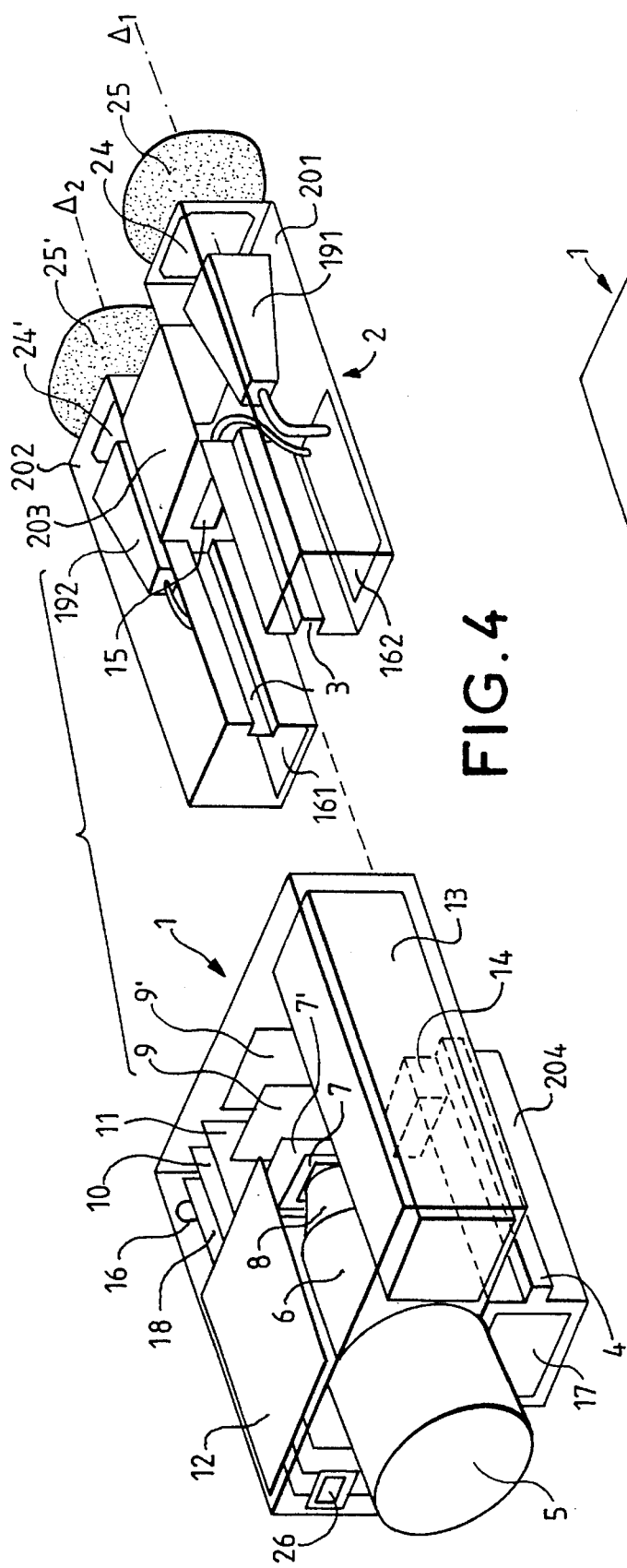
FIG. 4 shows another exemplary view of the device of the invention, seen split into its two modular parts.
Figure 6:
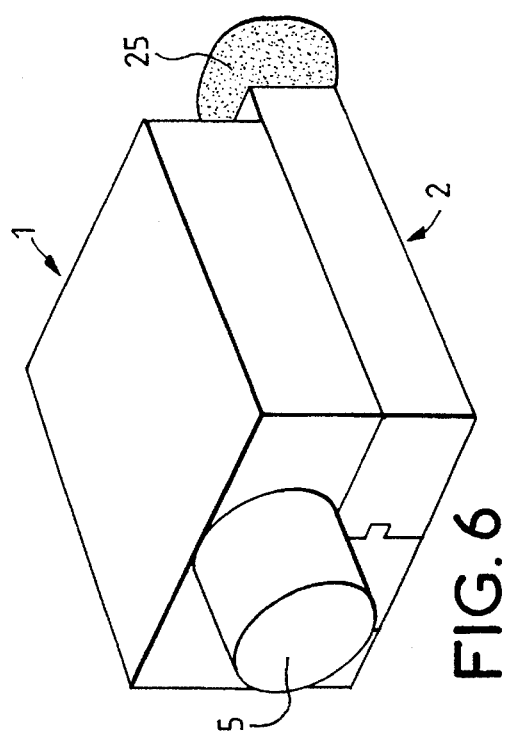
FIG. 6 shows an isometric projection of the device according to the invention.
Figure 5:
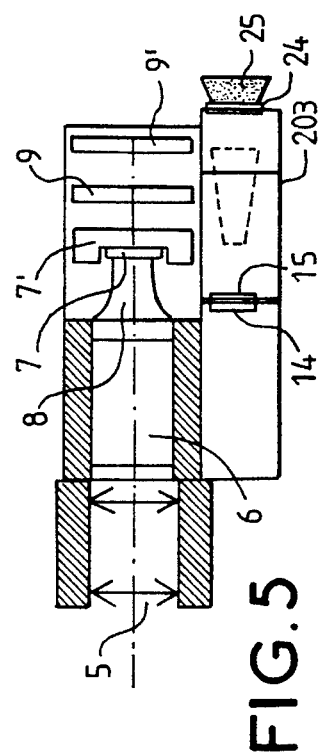
FIG. 5 shows a sectional view of the device according to FIG. 5, after assembly.

FIGS. 4–6 illustrate another exemplary embodiment, in modular form, of the device according to the invention, respectively in a view where it is split into its modular parts and in a sectional view after the fitting together of the modular parts. The identical elements of FIGS. 1 and 4 bear the same references. This second exemplary embodiment, which also has a modular structure, differs from the first one in that it implements an electronic display device, 191 or 192, on each optical channel of the binocular visor: in the exemplary embodiment illustrated, the binocular visor 2 takes the form of a casing with two arms 201 and 202, each arm enclosing an optical transmission channel with an axis Δ1 and Δ2 respectively. The arms are connected by a bridge 203 and get plugged into the casing of the body 1 of the binoculars around a central base 204 of this casing, by means of complementary slides and grooves 3 and 4, laid out respectively on the arms 201 and 202 of the binocular visor 2 as well as on the base 204.

The video signal is created, delivered and processed in the same way as in the exemplary embodiment already described. It is transmitted to the binocular visor module 2 through the half-connectors 14 and 15 that are respectively laid out in the base 204 of the body 1 of the binoculars and in the bridge 203 of the visor 2. The signal is then transmitted from the half-connector 15 to two electronic adaptor cards 161 and 162, each of these cards being positioned in an arm, 201 and 202 respectively, of the visor 2. Each card, 161 and 162, adapts the video signal in a known way in order to feed each display device 191 and 192, positioned in each of the arms, 201 and 202 respectively, of the binocular visor.

FIG. 5 shows an isometric projection of the device according to the invention, once the binocular visor 2 has been fitted into the body 1. The shape thus obtained o pertains equally well to either of the exemplary embodiments described here above. The objective 5 is interchangeable. Standard video objectives, with focal distances of 25, 50 or 75 mm, may be used, depending on the desired width of the field.

The invention is not limited to the exemplary embodiments described and shown here above. For example, an auxiliary illumination device 26, controlled by the user, may be integrated into the body of the binoculars (as shown in FIGS. 1 and 4) or to the visor. This device may be constituted by an infrared light-emitting diode (LED) source to be used for short-distance illumination (enabling the reading of maps for example).

It is furthermore possible to make the device according to the invention in one piece, the binocular visor being entirely joined in a fixed way to the body. Other adaptations, within the scope of those skilled in the art, are also possible: these include the obtaining of an electronic image in relief by the use of two combinations (each having an objective, light intensifier and detection matrix) instead of only one combination, one combination being associated with each of the optical channels of the binocular visor. The reducing interface may be obtained, firstly, by means of an optical system, for example a dimensionally adapted anamorphic optical system. A simplified version may also be implemented by using a monocular visor associated with only one electronic display device.

What is claimed is:

1. Night vision binoculars with electronic imaging, comprising:

an optical projection system for the projection of incident light from an observed scene, including, an objective through which incident light from the observed scene passes, a light intensifier tube coupled to the objective for converting incident light passed through the objective into a first image, and an image-reducing interface coupled to the intensifier tube to reduce the size of said first image and produce a second image;

a matrix detector coupled to the image-reducing interface for producing a video signal corresponding to said second image;

display means for converting said video signal into a video image and displaying said video image;

ocular means for viewing said video image displayed by said display means; and a casing on which is mounted the optical projection system, the matrix detector, the display means, and the ocular means, wherein said casing comprises two modules that fit into one another, including a body module comprising the optical projection system and the matrix detector, and a binocular visor module comprising the display means and the ocular means, the two modules forming said night vision binoculars.

2. Night vision binoculars according to claim 1, wherein the light intensifier tube is a microchannel tube and wherein the image-reducing interface is a conical harness of optical fibers.

3. Night vision binoculars according to claim 1, wherein the display means are a cathode-ray microtube.

4. Night vision binoculars according to claim 1, wherein the display means are a liquid crystal device.

5. Night vision binoculars according to claim 1, comprising processing cards for electronic processing of the video signal coming from the matrix detector.

6. Night vision binoculars according to claim 5, wherein the processing cards comprise means for receiving signals delivered by at least one of an electronic compass, a telemeter, and a dater to overlay information elements in the display means.

7. Night vision binoculars according to claim 1, comprising an output plug to which the video signal coming from the matrix detector is applied.

8. Night vision binoculars according to claim 1, wherein the body module comprises a first half-connector and the binocular visor module comprises a complementary second half-connector, the first half-connector delivering an output video signal so that the body module is connected to the binocular visor module, the two half-connectors being inserted into each other during the assembly of the two modules to transmit the video signal delivered by the matrix detector to the display means.

9. Night vision binoculars according to claim 1, wherein the body module has a housing to receive a front projection of the binocular visor module and wherein the binocular visor module has only one display means and optical duplication means coupled to the display means to form two channels of optical transmission positioned in two side parts of the visor module, said ocular means comprising two ocular devices coupled to said two channels so that the image displayed by the display means is then observed by said two ocular devices, one ocular device being located at the end of each side part.

10. Night vision binoculars according to claim 8, wherein the body module has a base and the binocular visor module has two arms which are connected by a bridge and received in the base of the body module, and wherein the binocular visor module has two display means, one display means being positioned in each arm, said ocular means comprising two ocular devices coupled to ends of said two arms so that the images displayed by the display means are then observed by the ocular devices located at the ends of the arms.

* * * * *